US007330225B2

(12) United States Patent
Yamaguchi

(10) Patent No.: US 7,330,225 B2
(45) Date of Patent: Feb. 12, 2008

(54) METHOD FOR ADJUSTING COLOR OF MONOCHROMATIC LIQUID CRYSTAL DISPLAY AND MEDICAL IMAGE DISPLAY APPARATUS

(75) Inventor: Akira Yamaguchi, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 0 days.

(21) Appl. No.: 10/401,579

(22) Filed: Mar. 31, 2003

(65) Prior Publication Data

US 2003/0193629 A1 Oct. 16, 2003

(30) Foreign Application Priority Data

Mar. 29, 2002 (JP) ............................ 2002-094248

(51) Int. Cl.
*G02F 1/133* (2006.01)
*G02F 1/1335* (2006.01)
*G09G 3/36* (2006.01)

(52) U.S. Cl. .......................... 349/73; 349/106; 345/88

(58) Field of Classification Search .................. 349/74, 349/106, 73; 345/88
See application file for complete search history.

(56) References Cited

U.S. PATENT DOCUMENTS 5,334,992 A * 8/1994 Rochat et al. ................ 345/22
5,808,778 A * 9/1998 Bauer et al. ................ 359/267
6,128,054 A * 10/2000 Schwarzenberger .......... 349/73
6,243,068 B1 * 6/2001 Evanicky et al. ........... 345/102
6,597,419 B1 * 7/2003 Okada et al. ............... 349/104
2002/0018034 A1 * 2/2002 Ohki et al. .................... 345/77
2002/0060688 A1 * 5/2002 Mizumoto .................. 345/591

* cited by examiner

*Primary Examiner*—David Nelms
*Assistant Examiner*—Hoan C. Nguyen
(74) *Attorney, Agent, or Firm*—Sughrue Mion, PLLC

(57) ABSTRACT

The color adjustment method adjusts a color of a monochromatic image on a LCD and each of LCDs. The method uses a plurality of light sources of different color temperatures as a backlight of the LCD and controls relative quantities of light from the light sources to adjust the color of the monochromatic image displayed on the LCD or each of the LCDs. The medical image display apparatus includes a plurality of LCDs, each displaying a monochromatic image, a backlight of each of the LCDs, the backlight having a plurality of light sources of different color temperatures and a unit for adjusting relative quantities of light from the light sources to adjust each color of the monochromatic image displayed on each of the LCDs.

7 Claims, 4 Drawing Sheets

METHOD FOR ADJUSTING COLOR OF MONOCHROMATIC LIQUID CRYSTAL DISPLAY AND MEDICAL IMAGE DISPLAY APPARATUS

BACKGROUND OF THE INVENTION

This invention relates to a method for adjusting a color of a monochromatic image of a liquid crystal display (LCD) and each of LCDs or a monochromatic LCD and monochromatic LCDs, and a medical image display apparatus. More particularly, the invention relates to the technology of enabling adjustment of the color difference between two or more medical monochromatic displays.

Medical image display systems often use monochromatic displays to represent a variety of radiation and other images. The frequently employed method is an extension from the conventional method of examining a plurality of films on a lantern slide and a plurality of monochromatic displays are placed side by side as they individually display an image. It is often pointed out that any difference that exists in color (sometimes called hue or color tone) between monochromatic displays introduces difficulty for the viewer (e.g. a doctor or a radiological technician) to examine the image.

This problem has been pointed out since the time of using monochromatic CRT displays. The color of CRT displays is subject to the constraints at the materials level exemplified by the lot-to-lot difference in the phosphor used in CRT manufacture and, hence, it has been held theoretically impossible to achieve color adjustment, or eliminate the color difference between monochromatic displays.

From various design considerations including smaller size, lighter weight and less power consumption, the CRT display is increasingly supplanted today by a liquid-crystal display, commonly abbreviated as LCD. However, if a plurality of LCDs are placed side by side and used as monochromatic displays, there still occurs the problem of color difference that exists between represented images.

The greatest difference between a CRT display and an LCD lies in the mechanism of light emission. In the CRT display, the phosphor excited by an electron beam emits light on its own (spontaneous luminescence) whereas in the LCD, light produced by illumination with a backlight such as a fluorescent lamp has its transmittance varied by liquid crystal to control brightness.

Because of this difference, the color of the CRT display is already fixed at the time of its manufacture and later adjustment is practically impossible. This is not the case with the LCD and it is by no means impossible to vary the color of a display image by changing the color of the backlight.

The backlight in the conventional common LCDs is an array of multiple cold cathode-ray tubes of about 3 mm in diameter that are so adapted that the emerging light is diffused uniformly. If the backlight itself is adapted to permit color change, the color of the image represented by the LCD becomes variable.

SUMMARY OF THE INVENTION

The present invention has been accomplished under these circumstances and has as an object providing a method for adjusting a color of a monochromatic image of a LCD and each of LCDs that solves the problems of the prior art by enabling adjustment of the colors of display images.

Another object of the invention is to provide a medical image display apparatus that implements the method of color adjustment.

In order to attain the first object described above, the present invention provides a method for adjusting a color of a monochromatic image on a liquid crystal display, comprising:

using as a backlight of the liquid crystal display a plurality of light sources of different color temperatures; and controlling relative quantities of light from the plurality of light sources to adjust the color of the monochromatic image displayed on the liquid crystal display.

Further, in order to attain the first object described above, the present invention provides a method for adjusting a color of a monochromatic image on each of a plurality of liquid crystal displays, comprising:

using as a backlight of each of the plurality of liquid crystal display a plurality of light sources of different color temperatures; and controlling relative quantities of light from the plurality of light sources to adjust each color of the monochromatic image as it is displayed on each of the plurality of liquid crystal displays.

Preferably, the plurality of light sources are cold cathode-ray tubes having correlated color temperatures between 6,000 K and 13,000 K. And, preferably, a color difference between two monochromatic images displayed on respective two of the plurality of liquid crystal displays is so adjusted as to satisfy the condition:

$$\Delta u'v' \leqq 0.004$$

where $\Delta u'v'$ is the distance between two points of u'v' coordinates in the CIE 1976 UCS chromaticity diagram.

In order to attain the second object described above, the present invention provides a medical image display apparatus that implements the method of color adjustment, comprising:

a liquid crystal panel for displaying a monochromatic image;

a backlight of the liquid crystal panel having a plurality of light sources of different color temperatures; and means for adjusting relative quantities of light from the plurality of light sources to adjust a color of the monochromatic image displayed on the liquid crystal panel.

Furthermore, in order to attain the second object described above, the present invention provides a medical image display apparatus that implements the method of color adjustment, comprising:

a plurality of liquid crystal displays, each displaying a monochromatic image;

a backlight of each of the plurality of liquid crystal displays, the backlight having a plurality of light sources of different color temperatures; and means for adjusting relative quantities of light from the plurality of light sources to adjust each color of the monochromatic image displayed on each of the plurality of liquid crystal displays.

Preferably, the plurality of light sources are cold cathode-ray tubes having correlated color temperatures between 6,000 K and 13,000 K. And, preferably, a color difference between two monochromatic images displayed on respective two of the plurality of liquid crystal displays is so adjusted as to satisfy the condition:

$$\Delta u'v' \leqq 0.004$$

where Δu'v' is the distance between two points of u'v' coordinates in the CIE 1976 UCS chromaticity diagram.

DETAILED DESCRIPTION OF THE INVENTION

Before describing various embodiments of the invention, we first describe the principle of the invention method for color adjustment of monochromatic LCDs.

To begin with, suppose the case of matching the color tones of two LCDs (LCD-A and LCD-B) each using two kinds of cold cathode-ray tube (specifically, fluorescent lamp) that have correlated color temperatures (hereunder sometimes referred to simply as "color temperatures") of 10,000 K and 7,000 K. Of course, each of these fluorescent lamps will undergo some fluctuation in color temperature and the procedures of color adjustment described below are capable of adjusting such fluctuation.

In the first step in the process, the fluorescent lamp in LCD-A that has a color temperature of 10,000 K (and which is designated A①) is selectively turned on and the chromaticity coordinates (x,y) in that state are measured. The same procedure is repeated by selectively turning on fluorescent lamps A②, B① and B② and measuring the chromaticity coordinates (x,y) in the respective states. The measrued chromaticity coordinates (x,y) are converted to u',v' coordinates in the CIE 1976 UCS chromaticity diagram by the following equations:

$$u'=4x/(-2x+12y+3) \quad (1)$$

$$v'=9y/(-2x+12y+3) \quad (2)$$

In the next step, determine a minimum length of the line connecting A① and A②, as well as a minimum length of the line connecting B① and B②. The two lines may intersect (as shown in FIG. 1) or may not intersect (FIG. 2) and these two cases are separately discussed below.

Figure 1:
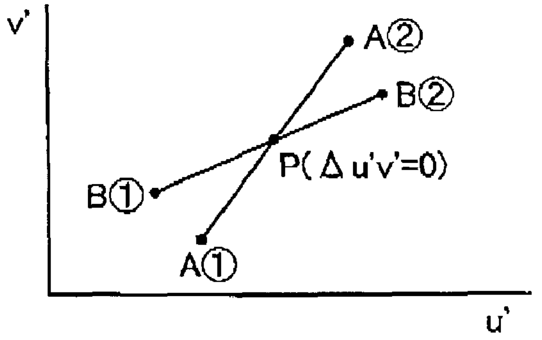
FIG. 1 is a diagram illustrating a principle of the invention for color adjustment of monochromatic LCDs.

We first discuss the case where the two lines intersect as shown in FIG. 1 as the result of (x,y) to (u',v') coordinate transformation. In this case, the (u',v') coordinates of point P at which the two lines intersect are determined by equations (3) and (4) and the fluorescent lamps in the respective LCDs are turned on to satisfy the determined conditions of point P:

$$A: \frac{nA}{mA+nA} \times A① + \frac{mA}{mA+nA} \times A② \quad (3)$$

$$B: \frac{nB}{mB+nB} \times B① + \frac{mB}{mB+nB} \times B② \quad (4)$$

$$\text{where } mA:nA = \overline{A①\,P} : \overline{PA②}$$

$$mB:nB = \overline{B①\,P} : \overline{PB②}$$

(the bars above A①P, PA②, B①P and PB② represent segments of a line).

Stated simply, the two fluorescent lamps A① and A② in LCD-A are controlled to produce light in relative quantities that satisfy equation (3) whereas the two fluorescent lamps B① and B② in LCD-B are controlled to produce light in relative quantities that satisfy equation (4). The control may be achieved by adjusting the magnitude of the current applied to turn on the two different kinds of fluorescent lamp. If equations (3) and (4) are satisfied, there is no color difference between the two LCDs and Δu'v' is equal to zero at point P.

Figure 2:
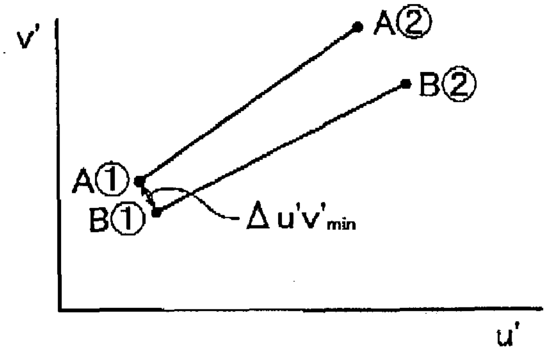
FIG. 2 is a diagram illustrating another principle of the invention for color adjustment of monochromatic LCDs.

If the two lines do not intersect and the result of coordinate transformation is as shown in FIG. 2, only fluorescent lamps A① and B① are turned on, with care being taken to satisfy the following condition:

$$\Delta u'v' \leqq 0.004 \quad (5)$$

In expression (5), Δu'v' is the distance between the two points of u'v' coordinates and represents the color difference; it is calculated by:

$$\Delta u'v' = \sqrt{\{(u_A'-u_B')^2+(V_A'=v_B')^2\}}$$

where ($u_A'$, $v_A'$) and ($u_B'$, $v_B'$) represent the chromaticity coordinates of LCD-A and LCD-B, respectively.

Condition (5) is adopted in Assessment of Display Performance for Medical Image display Systems, a standard being prepared by the American Association of Physicist in Medicine, and has good match with perception by the human vision.

The above discussion assumes that the fluorescent lamps in each LCD have no fluctuation in color temperature but in practice, the individual fluorescent lamps may sometimes undergo comparatively large fluctuations in color temperature. In that case, it may be impossible to realize fluorescent lamp combinations that satisfy the condition of Δu'v'≦0.004.

Figure 3:
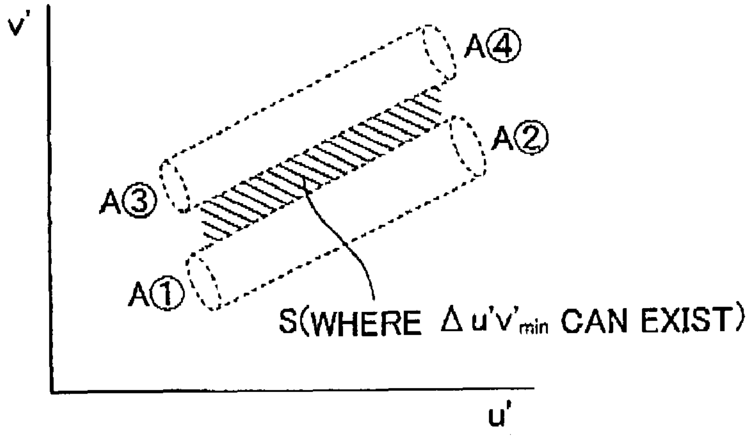
FIG. 3 is a diagram illustrating yet another principle of the invention for color adjustment of monochromatic LCDs.

FIG. 3 shows in concept the method that can be taken to deal with this situation assuming that each LCD employs four kinds of fluorescent lamp having different color temperatures. Oval portions A①-A④ represent the fluctuations in color temperature that the four fluorescent lamps A①-A④ may undergo.

Given this design, the relative quantities of the four fluorescent lamps may be adjusted such that the temperature of each LCD is within the hatched area S between the two thick pipes, one connecting oval portions A① and A② and the other connecting oval portions A③ and A④, and the condition of Δu'v'≦0.004 is satisfied between LCDs to cancel the color difference.

Figure 4:
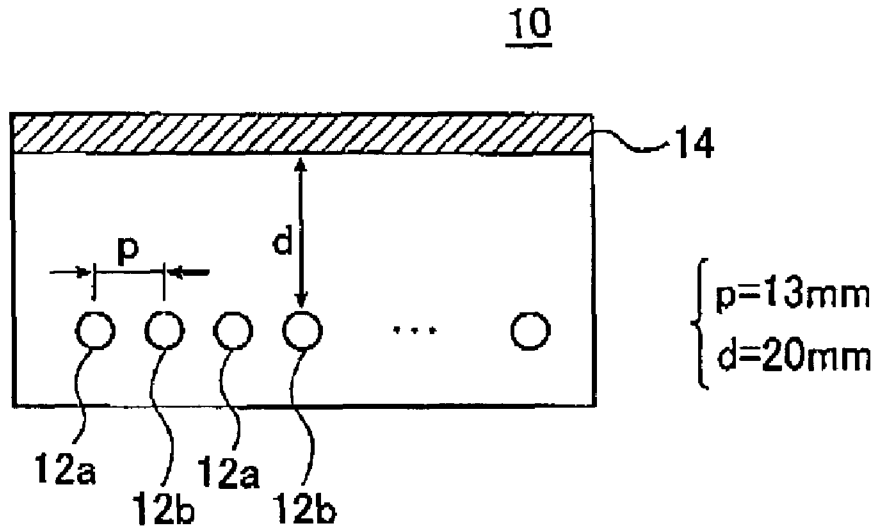
FIG. 4 is a cross-sectional side view showing in detail the structure of an LCD backlight that operates with the invention method for color adjustment of monochromatic LCDs according to an embodiment of the invention.

FIG. 4 is a cross-sectional side view showing in detail the structure of an LCD backlight 10 that operates with the invention method for color adjustment of monochromatic LCDs according to an embodiment of the invention. In the illustrated case, two fluorescent lamps 12*a* and 12*b*, each having a diameter of 3 mm, alternate in parallel on a pitch of 13 mm to give an array of 12 lamps. A diffuser plate 14 is provided on the side where light issues from each fluorescent lamp and the lamps are spaced from the diffuser plate 14 by a distance of 20 mm so that even if either fluorescent lamp 12*a* or 12*b* is turned off, there will be no unevenness in the quantity of issued light.

In the embodiment under consideration, fluorescent lamp 12*a* has a correlated color temperature of 6,000 K and fluorescent lamp 12*b* has a correlated color temperature of 13,000 K. This combination is chosen since in medical image display, colors with some blue shade are preferred for display.

Figure 5:
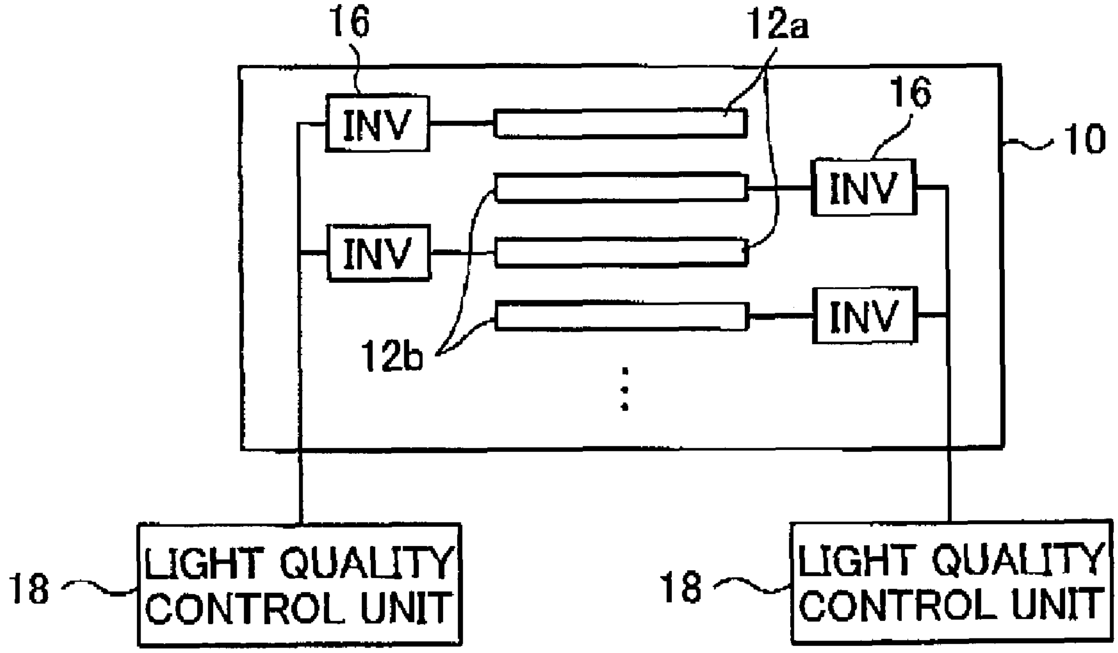
FIG. 5 is a diagram depicting the method of controlling the quantity of light from the backlight shown in FIG. 4.

As shown in FIG. 5, the 12 fluorescent lamps in the backlight 10 are Connected to light quantity control units 18 via inverters 16. The lamps are subjected to the control of light quantity in the manner described above so as to determine the ON conditions that satisfy the condition of $\Delta u'v' \leqq 0.004$ according to the scheme shown in FIG. 1 or 2. As a result, the color difference between two LCDs can be substantially eliminated.

In order to determine whether the color difference between two LCDs has been adjusted in a way that satisfies the condition of $\Delta u'v' \leqq 0.004$, evaluation by human vision is preferably combined with physical check through measurement with a color luminance meter. Since the light source and other components of the LCD will deteriorate over time, the measurement with a color luminance meter may preferably be continued at given time intervals.

In the foregoing embodiment, fluorescent lamps having different color temperatures are used as the light source but this is not the sole case of the invention and other light sources may be employed.

Figure 6:
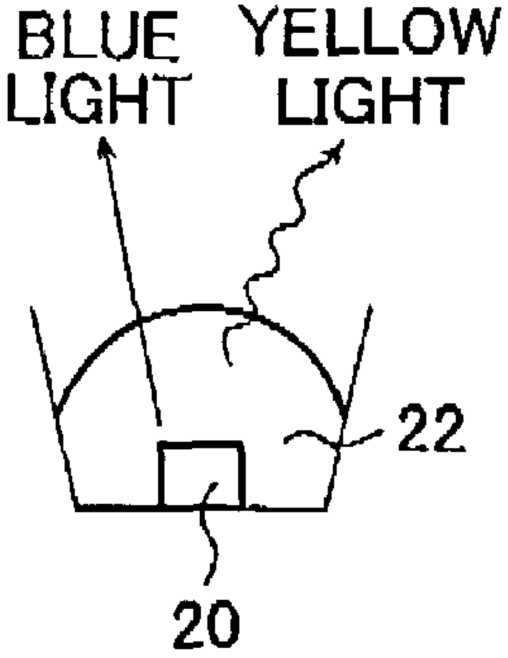
FIG. 6 shows schematically the structure of a white LED.

Described below is another embodiment of the invention, in which white LEDs having different color temperatures are used as the light source. FIG. 6 shows a typical example of white LED which consists of a blue LED 20 coated with a phosphor 22 that emits yellow light. By changing the thickness of the phosphor coat 22, the color temperature of the white LED can be altered fairly easily. Using several white LEDs with varied thicknesses of the phosphor coat 22, one can freely adjust the color of the backlight by entirely the same method as in the aforementioned case of using fluorescent lamps (cold cathode-ray tubes).

Needless to say, data must preliminarily be prepared to describe the correlation between current and luminance for the fluorescent lamp in the first embodiment or for the LED in the second embodiment. According to the embodiments described above, the shade of the color to be displayed on each LCD can be finely adjusted by controlling the color of its backlight and when a plurality of LCDs are installed side by side, an advantage is obtained in that the color difference between LCDs can be easily eliminated to satisfy the need of the viewer.

Figure 7:
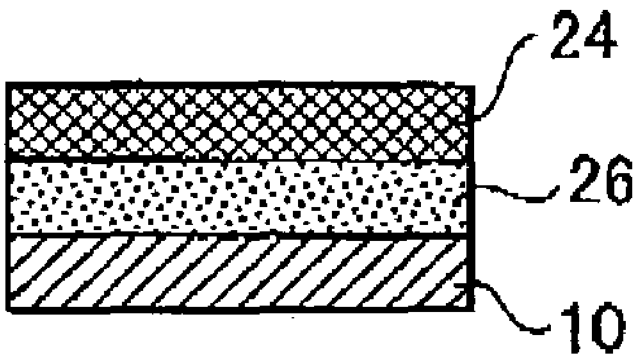
FIG. 7 is a cross section depicting an improved version of LCD.

FIG. 7 depicts yet another embodiment of the invention, in which a heat ray absorbing filter 26 is placed between the backlight 10 and the LCD panel 24. If the quantity of light from the backlight is increased with a view to making the LCD panel look brighter, the amount of heat emission also increases. The heat ray absorbing filter 26 can prevent the LCD from being damaged by the heat emitted.

Figure 8:
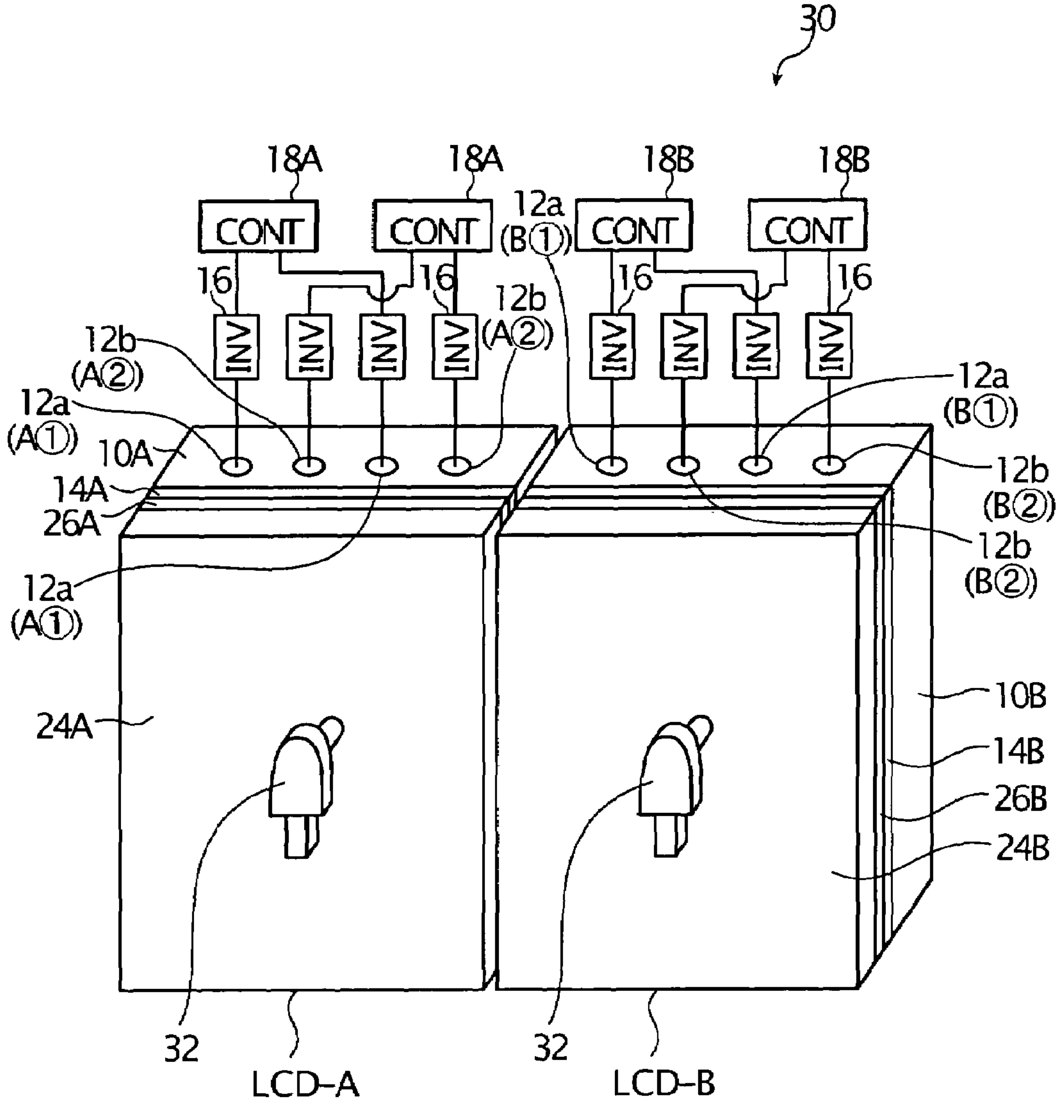
FIG. 8 is a schematic diagram showing the structure of a medical image display apparatus according to an embodiment of the present invention in which the color adjustment of monochromatic LCDs of the present invention is carried out.

FIG. 8 shows the medical image display apparatus according to the present invention which carries out the color adjustment of monochromatic LCDs of the present invention.

The medical image display apparatus 30 shown in FIG. 8 includes the above-described two LCDs. i.e., the LCD-A and LCD-B. The LCD-A comprises the LCD panel 24A, the backlight 10A, and the heat ray absorbing filter 26A intervening therebetween. The LCD-B comprises the LCD panel 24B, the backlight 10B and the heat ray absorbing filter 26B intervening therebetween.

The backlight 10A is provided with the diffusing plate 14A on its surface on side of the LCD panel 24A, and the two kinds of fluorescent lamps 12*a* (the above-described A①, for example (see FIGS. 1 and 2 )) and 12*b* (the above-described A②, for example), having different color temperatures, behind the backlight 10A. The two lamps 12*a* (A①) are respectively connected to the light Quantity control units (CONT) 18A*a* via the inverters (INV) 16, and the two lamps 12*b* (A②) are respectively connected to the light Quantity control units (CONT) 18A*b* via the inverters (INV) 16.

Similarly, the backlight 10B is provided with the diffusing plate 14B on its surface on side of the LCD panel 24B, and the two kinds of fluorescent lamps 12*a* (the above-described B①, for example) and 12*b* (the above-described B②, for example), having different color temperatures. behind the backlight 10B. The two lamps 12*a* (B①) are respectively connected to the light quantity control units (CONT) 18B*a* via the inverters (INV) 16, and the two lamps 12*b*(B②) are respectively connected to the light Quantity control units (CONT) 18B*b* via the inverters (NV) 16.

The illustrated medical image display apparatus 30 carries out the color adjustment of monochromatic LCDs of the present invention so as to eliminate a color difference between these LCD-A and LCD-B.

The backlights 10A and 10B using the two kinds of fluorescent lamps 12*a* (A① and B① ) and 12*b* (A② and B②) with different color temperatures are controlled in such a manner that light Quantities of the respective fluorescent lamps 12*a* and 12*b* may be controlled by the light Quantity control units 18A*a* and 18B*a*, and 18A*b* and 18B*b* as described above to thereby satisfy the condition $\Delta u'v' \leqq 0.004$. Having such the illuminating condition of the fluorescent lamps beforehand, the apparatus is intended to substantially eliminate a color difference between these two LCDs. In the present invention, preferably, two displayed colors of the LCD-A and LCD-B are measured by, for example, a color luminance meter 32, and light quantities of the respective fluorescent lamps 12*a* and 12*b* are controlled so as to satisfy the condition $\Delta u'v' \leqq 0.004$. However, the light quantities may be controlled according to an evaluation by human vision of displayed color difference between the two LCDs.

The foregoing embodiments are given for illustrative purposes only and are by no means intended to limit the invention. Various modifications or improvements can of course be made without departing from the scope and spirit of the invention.

As described above in detail, the present invention offers the marked advantages of providing a method for color adjustment of monochromatic CLDs that can alter the color of a displayed image and a medical image display apparatus that implements the method. More specifically, the invention provides a medical image display apparatus having a backlight that comprises a plurality of light sources of different color temperatures and means for adjusting the relative quantities of light from said light sources and which can be adjusted in the shade of the color it presents.

What is claimed is:

1. A method for adjusting a color of a monochromatic image on each of a plurality of liquid crystal displays, comprising:

using as a backlight of each of said plurality of liquid crystal display a plurality of light sources of different color temperatures; and controlling relative quantities of light from said plurality of light sources to adjust each color of the monochromatic image as it is displayed on each of said plurality of liquid crystal displays, wherein a color difference between two monochromatic images displayed on respective two of said plurality of liquid crystal displays is so adjusted as to satisfy the condition:

$$\Delta u'v' \leqq 0.004$$

where Δu'v' is the distance between two points of u'v' coordinates in the CIE 1976 UCS chromaticity diagram.

2. The method according to claim 1, wherein said plurality of light sources are cold cathode-ray tubes having correlated color temperatures between 6,000 K and 13,000 K.

3. The method according to claim 1, wherein each of monochromatic images capable of being observable independently is displayed on each of said plurality of liquid crystal displays.

4. The method according to claim 1, wherein a color difference between two monochromatic images displayed on respective two of the plurality of liquid crystal displays is adjusted so that the color difference is minimized.

5. The method of claim 1, wherein the monochromatic image comprises a single color shade.

6. The method of claim 1, wherein the monochromatic image is a medical image.

7. The method of claim 1, wherein the plurality of liquid crystal displays have gaps therebetween.

* * * * *